United States Patent Office 3,472,213
Patented Oct. 14, 1969

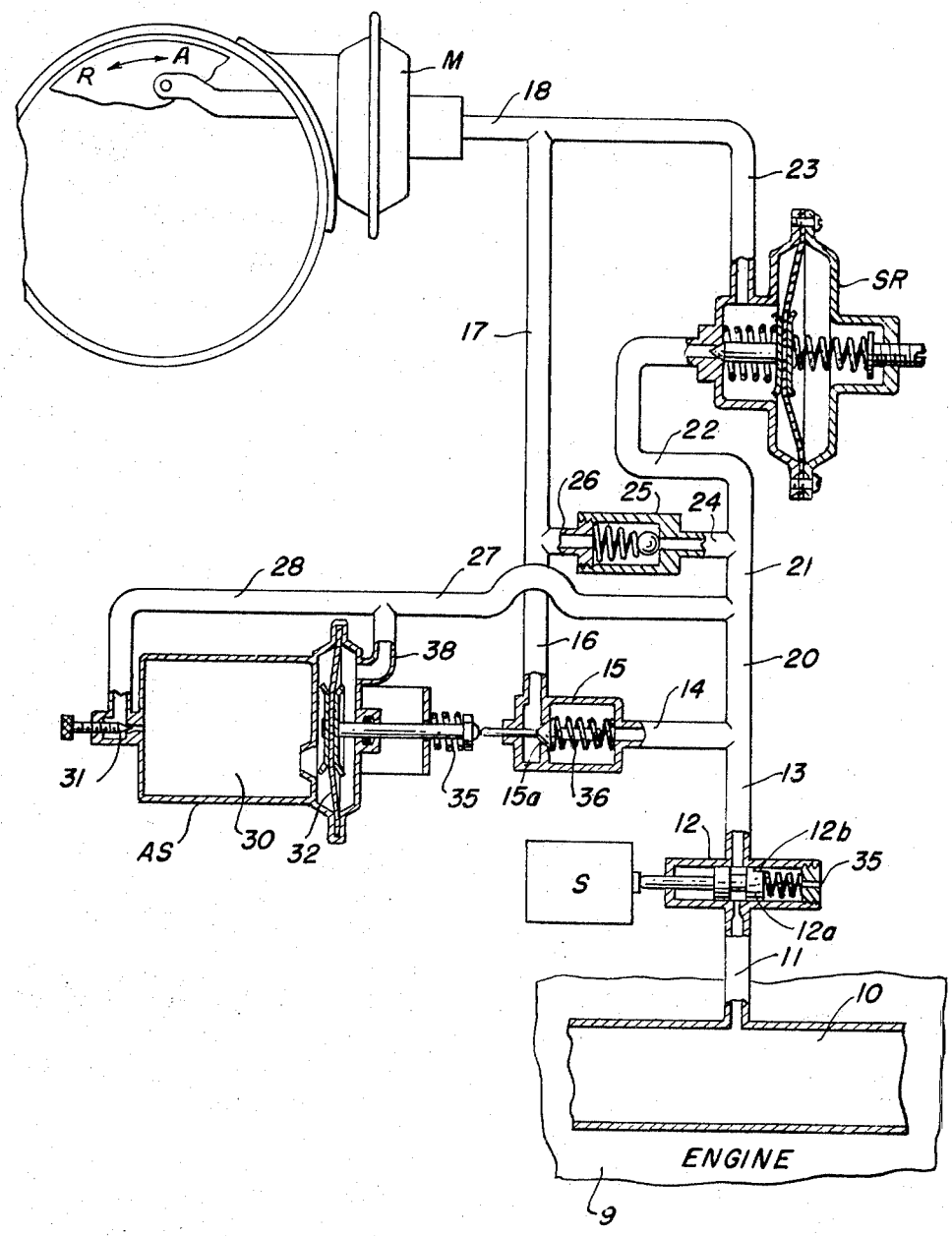

3,472,213
SPARK TIMING CONTROL
Brooks Walker, 1280 Columbus Ave.,
San Francisco, Calif. 94133
Filed June 22, 1967, Ser. No. 648,043
Int. Cl. F02d *11/10;* F02p *5/04*
U.S. Cl. 123—117                                  8 Claims

ABSTRACT OF THE DISCLOSURE

This invention pertains to a structure for providing a limited suction operated spark advance compared to full suction operated spark advance for a limited time after the start of an acceleration of a vehicle driven by an internal combustion engine. This is accomplished by inserting a suction regulating valve between an acceleration sensing device and the suction operated spark advance and means for rendering such suction regulating valve ineffective by the use of a bypass circuit and acceleration sensing control valve over most driving operations to get such limited suction operated spark advance after the start of such accelerations, such limited spark advance on acceleration will produce reduced exhaust emissions at such time.

---

An object of this invention is to provide a device having a suction regulating valve in one of two suction conducting paths to the suction actuated spark advance mechanism and an acceleration sensing device for closing off the other path so that the path through said regulating valve controls the suction and action to less than full stroke of said suction operated spark advance mechanism after the start of some acceleration.

Another object is a check valve between said two paths to act as a bleed when the valve operated by the acceleration sensing device is closed (as after the duration of the time cycle of said acceleration sensing device) and the suction regulation valve is also closed, to allow the suction operated spark advance device to be bled down as by a very slight suction in the intake manifold as a source of suction to operate said suction operated spark advance mechanism which can flow from said intake manifold through said check valve to bleed down said suction operated spark advance mechanism.

My pending U.S. patent application Ser. No. 571,563, entitled "Servo Mechanism," dated Aug. 10, 1966, and Ser. No. 615,469, entitled "Engine Spark Timing Device," dated Feb. 13, 1967, describes a device for temporarily retarding the spark by cutting out the action of the suction operated spark advance after the start of an acceleration for a predetermined period of time but no means of limiting such suction operated spark advance, which may be desirable to lower exhaust emissions.

Another object is a circuit that can be used with various types of acceleration sensing devices to operate the valve to shut off the suction path that bypasses the suction regulating valve.

Another object is the use of a check valve between the two lines to bleed down the suction operated spark advance when the regulator valve is closed and the other path is closed off.

Other objects will be more particularly pointed out in the accompanying specification and claims.

I have illustrated my invention in the accompanying drawing which shows one form of the invention partly cut away and partly in section.

I have shown an intake manifold 10 of an engine 9. A tube 11 communicates from manifold 10 to a valve 12 which is actuated by a speed sensing motor S. Motor S could be actuated by the pressure of the liquid in a cooling water pump following the rotor of said pump, as shown in my U.S. patent Ser. No. 3,204,620, entitled "Speed Sensing Device," dated Sept. 7, 1965, or any other type of speed sensor capable of actuating a valve, such as valve 12. One suction path is formed by line 13 connecting to line 14 which is connected to suction operated spark advance motor M through valve 15, line 16, line 17 and line 18. A second suction path goes from line 13 to line 18 and suction operated spark advance motor M via line 20, line 21, line 22, suction regulation valve SR and line 23. A path from said first path and said second path is formed by tube 24, check valve 25 and tube 26. Tube 27 connects acceleration sensor AS to tube 13. Tube 28 is connected to reservoir 30 through adjustable flow valve 31 and to the left side of diaphragm 32 to exert a force on the left side of said diaphragm (as viewed in the drawing) representing what the manifold suction was before the acceleration started while the suction on the right side of the diaphragm 32 as conducted by tube 38 represents what the suction is during the accelerations which is a lesser suction than before acceleration and this difference causes the diaphragm 32 to move to the left, as shown, until the valve 15*a* in valve 15 closes. With valve 15 closed the suction from manifold 10 must pass through suction regulator SR to reach the suction actuated spark advance motor M and such regulated and reduced suction provides a limited advance (or limited relative spark retard) compared to the advance that would have existed if it had not been for this suction regulated circuit. This continues until the suction in reservoir 30 is nearer equal to the suction in intake manifold 10, line 27 and the right side of diaphragm 32 at which point valve 15*a* will be opened by spring 35 being stronger than spring 36 to terminate such suction operated limited spark advance. Check valve 25 will allow trapped suction in motor M to bleed down when valve 15 and valve SR are closed by allowing lower gage suction from manifold 10 to flow to motor M by line 11, valve 12, lines 13, 20, 21, 24, check valve 25, lines 26, 27 and 18, thereby eliminating the need for a bleed in the circuit including motor M, tubes 18, 23, 17, 16, and 26. At low speeds, speed sensor S will cut off suction from manifold 10 and line 11 to line 13 and the motor M by either said first or second suction path. A slight bleed 12*b* from the top of the right end of valve 12*a* and out through vent 35 to relieve trapped suction in motor M and the circuits between motor M and valve 12 to provide no suction operated spark advance at engine idle which is desirable for lower unburned hydrocarbon emissions at idle. Further spark retard at idle may be provided by a suction actuated spark retard at idle or a governor retard at idle, not shown, as they are not part of this invention. The limited spark advance that is less than normal suction actuated spark advance for limited times after the start of accelerations will also result in reduced hydrocarbon exhaust emissions on such accelerations which are very important during these important accelerations as exhaust emission during accelerations are weighed around 50% of total driving cycles as now measured.

I claim as my invention:

1. An internal combustion engine for driving a motor vehicle, an intake manifold for passing engine developed suction leading to said engine, a suction actuated spark advance motor, an acceleration sensor and timer, a suction regulator first valve to regulate suction passing through it to a lower lever than the suction existing at said intake manifold at a preselected engine speed, a second valve actuated by said acceleration sensor, two parallel circuits for conducting suction from said port to said suction actuated spark advance motor including a first and a second circuit, said regulator first valve being in said first circuit, said second valve being in said second circuit, said second valve being closed temporarily by said acceleration sensor and timer after the start of some accelerations of said engine and vehicle so as to result in a lesser spark advance by said suction operated spark advance due to said regulator in the path open to said advance mechanism than when not accelerating and said valve is open to bypass said regulator.

2. A device as defined in claim 1, in which there is a third valve between said engine developed suction and said second valve actuated by said acceleration sensing device, said third valve controlling the suction flowing from said engine source to said acceleration sensing device operated valve, said third valve closing off engine developed suction at idle engine operation.

3. A device as defined in claim 1, in which there is a check valve between said first circuit with said first regulator valve in it and the second circuit with said second valve actuated by said acceleration sensing device in it to control flow from the engine side of said regulator first valve to the suction actuated spark advance motor side of said acceleration sensing device operated second valve to allow a bleed down of said suction actuated motor when said first valve and said second valve are both closed and the engine developed suction at said port is less than the suction in said suction actuated spark advance motor.

4. A spark timing control for an internal combustion engine having an intake manifold comprising a source of vacuum, said control comprising a vacuum operated spark timing motor, means for supplying a regulated vacuum less than said source vacuum to the motor for a predetermined time interval after initiation of acceleration of the engine for providing limited operation of said motor, and means for supplying source vacuum to the motor after said time interval for providing full operation of the motor, said means for supplying the regulated vacuum comprises a conduit connecting the manifold with the motor, a valve in said conduit for controlling the flow of fluid therethrough, and means connected to the valve and responsive to the degree of vacuum in the conduit for regulating the valve.

5. A device as defined in claim 4 wherein the means for supplying source vacuum comprises a separate conduit connecting the manifold with the motor, a valve in said conduit for controlling the flow of fluid therethrough, and means responsive to changes in source vacuum for operating the valve.

6. A device as defined in claim 5 further including means responsive to a preselected range of speed of the engine to close the vacuum source to the motor.

7. A spark timing control for an internal combustion engine having an intake manifold comprising a source of vacuum, said control comprising a vacuum operated spark timing motor, means for supplying a regulated vacuum less than said source vacuum to the motor for a predetermined time interval after initiation of acceleration of the engine for providing limited operation of said motor, means for supplying source vacuum to the motor after said time interval for providing full operation of the motor, and means responsive to a preselected range of speed of the engine to close the vacuum source to the motor.

8. A spark timing control for an internal combustion engine having an intake manifold comprising a source of vacuum, said control comprising a vacuum operated spark timing motor having a preselected working stroke, means for supplying a regulated vacuum less than said source vacuum to the motor for a predetermined time interval after initiation of acceleration of the engine for providing a limited stroke operation of said motor, and means for supplying source vacuum to the motor after said time interval for providing full stroke operation of the motor.

References Cited
UNITED STATES PATENTS

| | | | |
|---|---|---|---|
| 2,229,821 | 1/1941 | Seymour | 123—117.1 |
| 2,650,581 | 9/1953 | Short | 123—117.1 |
| 3,051,150 | 7/1962 | Johnson | 123—117.1 |
| 3,131,681 | 5/1964 | Goodyear | 123—117.1 |
| 3,162,184 | 2/1964 | Walker | 123—117.1 |

MEYER PERLIN, Primary Examiner

U.S. Cl. X.R.

123—102